United States Patent [19]

Crumpacker

[11] 4,144,844
[45] Mar. 20, 1979

[54] GRAZING REGULATOR

[76] Inventor: William H. Crumpacker, 1538 School Ave., Walla Walla, Wash. 99362

[21] Appl. No.: 859,690

[22] Filed: Dec. 12, 1977

[51] Int. Cl.² ............................................. A01K 25/00
[52] U.S. Cl. .................................................... 119/133
[58] Field of Search ............... 119/129, 130, 131, 132, 119/133, 142

[56] References Cited

U.S. PATENT DOCUMENTS

| | | | |
|---|---|---|---|
| 664,800 | 12/1900 | White | 119/133 |
| 806,004 | 11/1905 | Rowland | 119/133 |
| 1,210,244 | 12/1916 | Williams | 119/130 |
| 1,927,242 | 9/1933 | Miner | 119/133 |

Primary Examiner—Hugh R. Chamblee
Attorney, Agent, or Firm—Wells, St. John & Roberts

[57] ABSTRACT

A grazing regulator is mountable to the head of a grazing animal to automatically prevent the animal from eating short grass, while allowing the animal to graze on taller grass. The regulator includes a rigid frame that is mounted on the animal's head where it pivotably mounts a pair of rocker arms. A grazing plate is fixed to the lower ends of the rocker arms and is pivotable in unison with the arms between an operative position where the plate substantially overlaps the animal's mouth to prevent eating, and an inoperative position wherein the plate is pivoted clear of the animal's mouth. Movement of the plate between these positions is effected by an actuator rod slidably mounted to the framework. A lower end of the actuator rod protrudes below the grazing plate to engage the ground and slide upwardly as the animal moves its head toward the ground surface. The upper end of the rod is connected to an upper end of the rocker arm. It causes pivotal movement of the rocker arm and grazing plate. Therefore, the plate will automatically pivot to the operative position when the animal's head reaches a selected elevational position.

3 Claims, 3 Drawing Figures

GRAZING REGULATOR

BACKGROUND OF THE INVENTION

It is well known that grass plants are damaged when animals graze too close to the ground level. Since the entire plant is manufactured in the leaves and stems, it follows that overgrazing causes the weakened plants to become poor competitors and/or even perhaps to die out. Unpalatable weeds invade the pasturelands and useful production is greatly reduced. Also many animals overeat, become obese, and breed poorly.

This device relates to apparatus for selectively preventing animals from grazing below a prescribed level and at the same time force them to get more exercise.

DETAILED DESCRIPTION OF A PREFERRED EMBODIMENT

Figure 1:
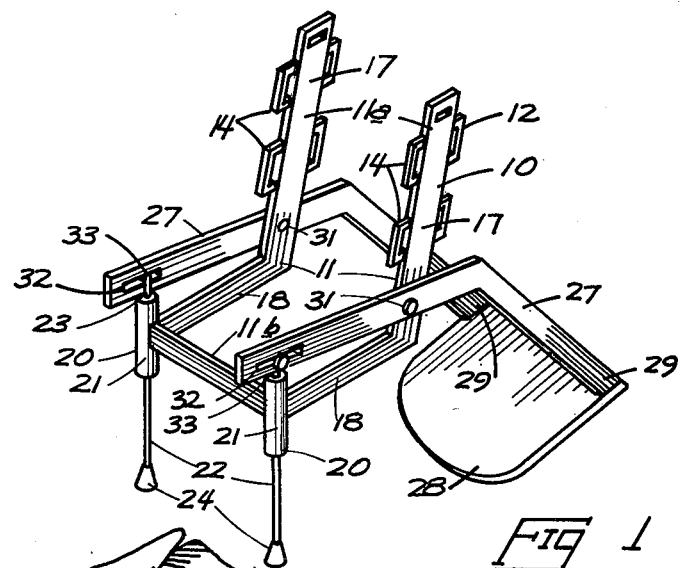
FIG. 1 is a pictorial view of the present grazing regulator.
Figure 2:
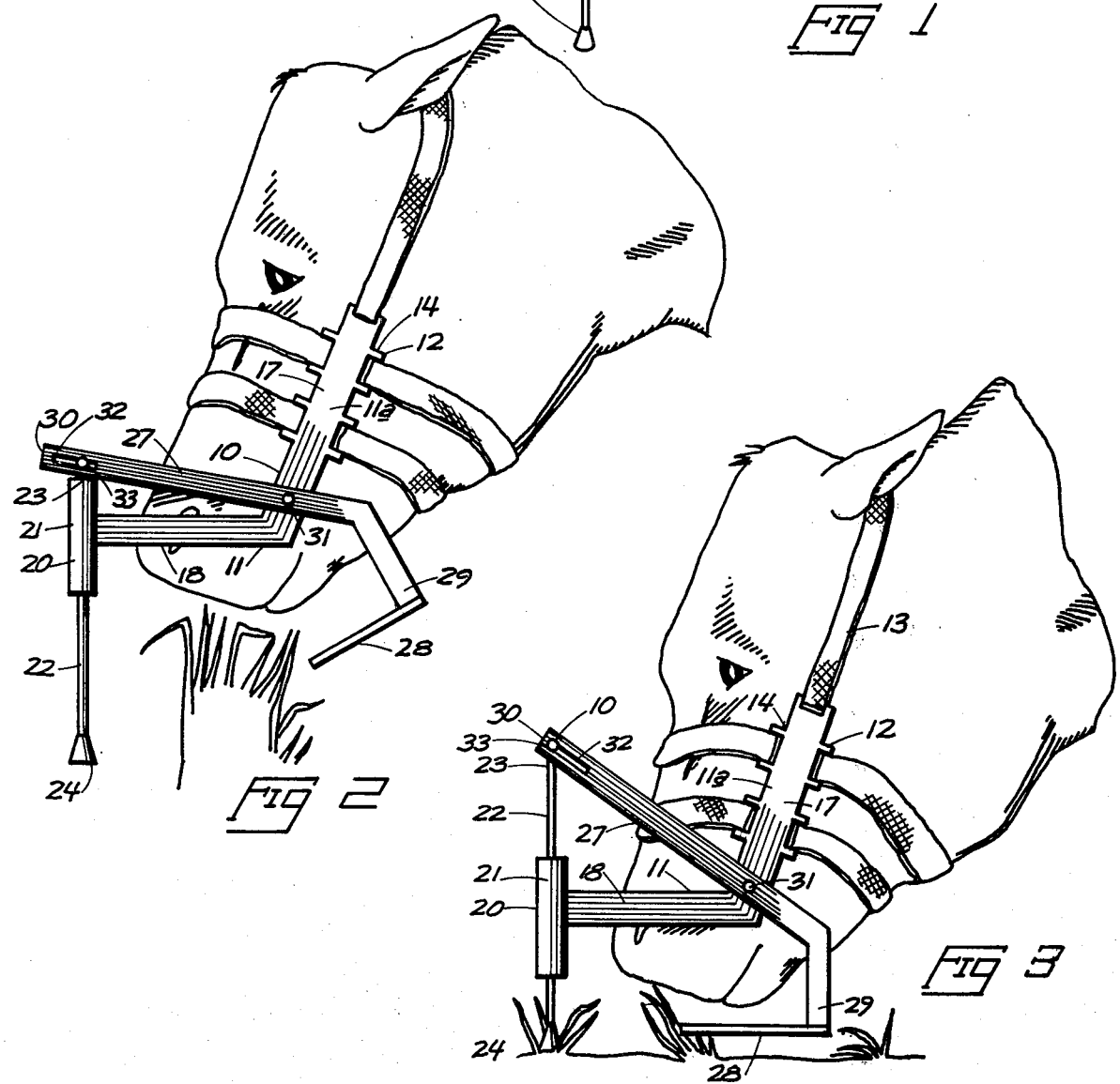
FIG. 2 is a view of the regulator in an inoperative condition and mounted to an amimal's head.
Figure 3:
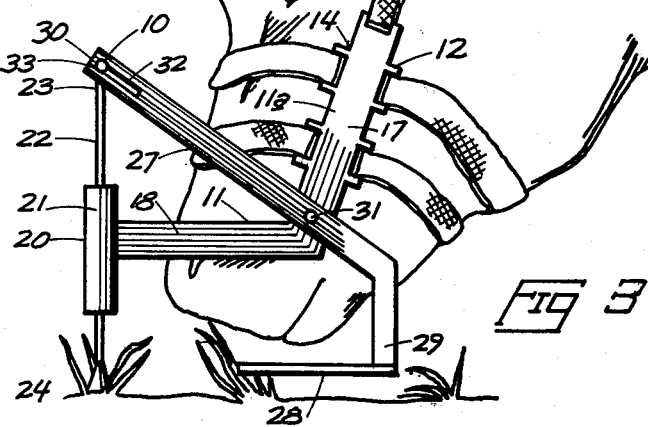
FIG. 3 is a view similar to FIG. 2, showing the components of the present invention in an operative condition.

The grazing regulator of the present invention is indicated in the accompanying drawings by the reference character 10. It is shown in FIG. 1 separately and in FIGS. 2 and 3 in use mounted on an animal's head. The regulator includes a rigid frame 11 that is generally "L" shaped as seen in FIGS. 2 and 3. As shown in FIG. 1, the frame is preferably comprised of two L-shaped elements 11a interconnected by a transverse bar 11b. The opposed spaced elements 11a fit on opposite sides of an animal's muzzle. Frame 11 is releasably and adjustably fitted to the animal's head by a mounting means 12. Means 12 is simply comprised of halter straps 13 that extend around the muzzle and poll of the animal's head. Straps 13 are mounted to the frame 11 by means of integral loops 14.

The L-shaped elements of frame 11 each include an upright leg 17 and a forwardly-projecting leg 18.

Guide means 20 is provided on the frame 11 at the outward ends of horizontal transverse legs 18. Guide means 20 is comprised of sleeves 21 fixed in substantially upright orientations to slidably receive a pair of actuator rods 22.

The actuator rods 22 include upper ends 23 that project above the sleeves 21 and enlarged lower ends 24 for engaging a ground surface. The length of the actuator rods 22 may be determined according to the associated length of vegetation that is desired to be protected from the grazing animal.

At least one and preferably a pair of rocker arms 27 are pivotally mounted to the frame at 31 adjacent the juncture of upright legs 17 and horizontal legs 18. The arms are mounted about a common pivot axis that is transverse to the upright frame legs 17 and substantially parallel to the axis or locus about which the animal's jaw articulates.

A grazing plate 28 is affixed to the lower ends 29 of arms 27. The plate lies within a plane substantially parallel to the pivot axis. It will pivot with the arms 27 between an inoperative position (FIG. 2) and an operative position (FIG. 3) in response to movement of the actuator rods through their engagement with a ground surface.

Upper ends 30 of rocker arms 27 are operatively connected to the upper ends 23 of the actuator rods 22. The arms 27 each include appropriate slots 32 which receive pins 33. These pins 33 interconnect the rocker arms 27 and upper ends of the actuator rods 22.

In operation, the regulator is first mounted to an animal's head by the halter straps 13. As shown in the drawings, one strap may extend about the poll of the animal's head while one or two other straps extend transversely about the animal's muzzle. When the frame is accurately positioned on the animal's head, the upright legs 17 are longitudinally aligned with the muzzle and the junctures of the legs 17 and 18 are located adjacent to the animal's mouth.

While the animal grazes on taller grass, the weight of actuator rod 22 will cause the rocker means 27 and associated grazing plate 28 to remain in the inoperative position. The plate in this position is clear of the animal's mouth and allows the animal to graze freely on tall grasses and other vegetation. However, if the animal lowers its head closer to the ground surface, the lower ends 29 of the actuator rods come into contact with the ground surface. The sleeves then slide downwardly over the rods. This correspondingly pivots the upper ends of rocker arms 27 and grazing plate 28 to the operative position overlapping the animal's mouth. This condition is illustrated in FIG. 3. Obviously, in the operative position, the plate 28 covers the animal's mouth and prevents it from eating the shorter vegetation. Once the animal raises its head, the rods will slide downwardly causing the plate to pivot to the inoperative position.

If desired, the actuator rods 22 may be adjustable in length. For instance, each rod 22 might be constructed of two coaxial telescoping tubes and a suitable detent or locking member. Adjustment of the length of the actuator rods 22 will permit modification of the minimum grass height accessible to the animal before plate 28 moves into the position shown in FIG. 3.

It is noted that the above description and attached drawings are given only for the purpose of describing a preferred form of the invention. Such description is not intended in any manner to restrict the scope of my invention.

What I claim is:

1. A grazing regulator mountable on the head of an animal, comprising:

a rigid frame;

mounting means on the frame for securing the frame to the muzzle of an animal adjacent to its mouth;

an actuator rod having an upper end and a lower end;

upright guide means on said frame slidably mounting the actuator rod to the frame for up and down sliding movement in relation thereto;

a grazing plate;

a rocker arm having a lower end affixed to the grazing plate and an upper end operatively connected to the upper end of the actuator rod, said rocker arm being pivotably mounted to the frame intermediate the lower and upper rocker arm ends for movement about a transverse axis on the frame;

wherein the grazing plate is movable about said axis between an inoperative position clear of the animal's mouth to allow it to eat tall grasses and an operative position overlapping the animal's mouth to prevent it from eating short grasses; and said lower end of the actuator rod projecting beneath the grazing plate when the plate is in the inoperative position to permit it to engage the ground and slide upward within the guide means to pivot the grazing plate to the operative position as the head of the animal is lowered to a predetermined elevation above the ground.

2. The grazing regulator as set out by claim 1 wherein said mounting means further comprises: halter straps extendable about the muzzle of an animal and its poll to secure the frame to the animal's head and position the frame relative to the animal's mouth.

3. The grazing regulator as set out by claim 1 wherein the frame is L-shaped having an upright leg and a forwardly projecting leg joined thereto, the mounting means being located on the upright leg and the upright guide means being located on the forwardly-projecting leg.

* * * * *